(12) United States Patent
Ferens

(10) Patent No.: US 9,344,608 B2
(45) Date of Patent: May 17, 2016

(54) SYSTEMS, METHODS, AND COMPUTER PROGRAM PRODUCTS FOR HIGH DEPTH OF FIELD IMAGING

(71) Applicant: Intel Corporation, Santa Clara, CA (US)

(72) Inventor: Ron Ferens, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 13/628,888

(22) Filed: Sep. 27, 2012

(65) Prior Publication Data

US 2014/0086476 A1    Mar. 27, 2014

(51) Int. Cl.
| | |
|---|---|
| *G06K 9/00* | (2006.01) |
| *H04N 5/222* | (2006.01) |
| *G06T 5/00* | (2006.01) |
| *G06T 5/50* | (2006.01) |

(52) U.S. Cl.
CPC .............. *H04N 5/2226* (2013.01); *G06T 5/003* (2013.01); *G06T 5/50* (2013.01); *G06T 2207/10016* (2013.01); *G06T 2207/20012* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2010/0165152 A1* | 7/2010 | Lim ......................... | 348/240.99 |
| 2013/0051673 A1* | 2/2013 | Wernersson et al. ......... | 382/173 |
| 2013/0057655 A1* | 3/2013 | Su et al. .......................... | 348/47 |

OTHER PUBLICATIONS

Parvizi, Ehsan, and QM Jonathan Wu. "Multiple object tracking based on adaptive depth segmentation." Computer and Robot Vision, 2008. CRV'08. Canadian Conference on. IEEE, 2008.*

* cited by examiner

*Primary Examiner* — Sumati Lefkowitz
*Assistant Examiner* — David Perlman
(74) *Attorney, Agent, or Firm* — Green, Howard & Mughal LLP

(57) ABSTRACT

Methods, systems, and computer program products allow for the capturing of a high depth of field (DOF) image. A comprehensive depth map of the scene may be automatically determined. The scene may then be segmented, where each segment of the same corresponds to a respective depth of the depth map. A sequence of images may then be recorded, where each image in the sequence is focused at a respective depth of the depth map. The images of this sequence may then be interleaved to create a single composite image that includes the respective in-focus segments from these images.

6 Claims, 9 Drawing Sheets

SYSTEMS, METHODS, AND COMPUTER PROGRAM PRODUCTS FOR HIGH DEPTH OF FIELD IMAGING

BACKGROUND

The term "depth of field" (DOF) describes the distance between the nearest and farthest objects in a scene that appear acceptably sharp in an image. Control over the sharp and hazy parts of the image may be of considerable importance for the quality of a photograph. When a lens focuses on a subject at a specific distance, all subjects at that distance are sharply focused. Subjects that are not at the same distance are generally out of focus and not sharp. However, since the human eye cannot distinguish very small degrees of blurriness, some subjects that are in front of or behind the sharply focused subjects may still appear sharp. The zone of acceptable sharpness is referred to as the depth of field. Thus, increasing the depth of field increases the sharpness of an overall image.

Generally, the depth of field may depend on several factors, including the object distance, the focal distance, the f-number of the camera's lens, and on the perceptivity of the observer. Thus, in order to set the DOF that corresponds to the main object in the captured scene, the photographer is typically required to take these parameters into account and set the focal distance accordingly. Modern cameras may remove the need for manual adoption of the camera settings by using any of several complicated automatic mechanisms and processes. As result, the selected main object will not suffer from blurriness in the output image. This outcome, however, results in the blurriness of objects that are located at different distances from this main object (either farther or closer with respect to the camera).

Currently, there are no systems that can generate an output image with high DOF to match the captured scene automatically. All available systems either require manual setting of the camera to one or more determined focal distances, or can adjust the DOF to a single object in the output image using post-processing methods.

BRIEF DESCRIPTION OF THE DRAWINGS/FIGURES

Figure 1:
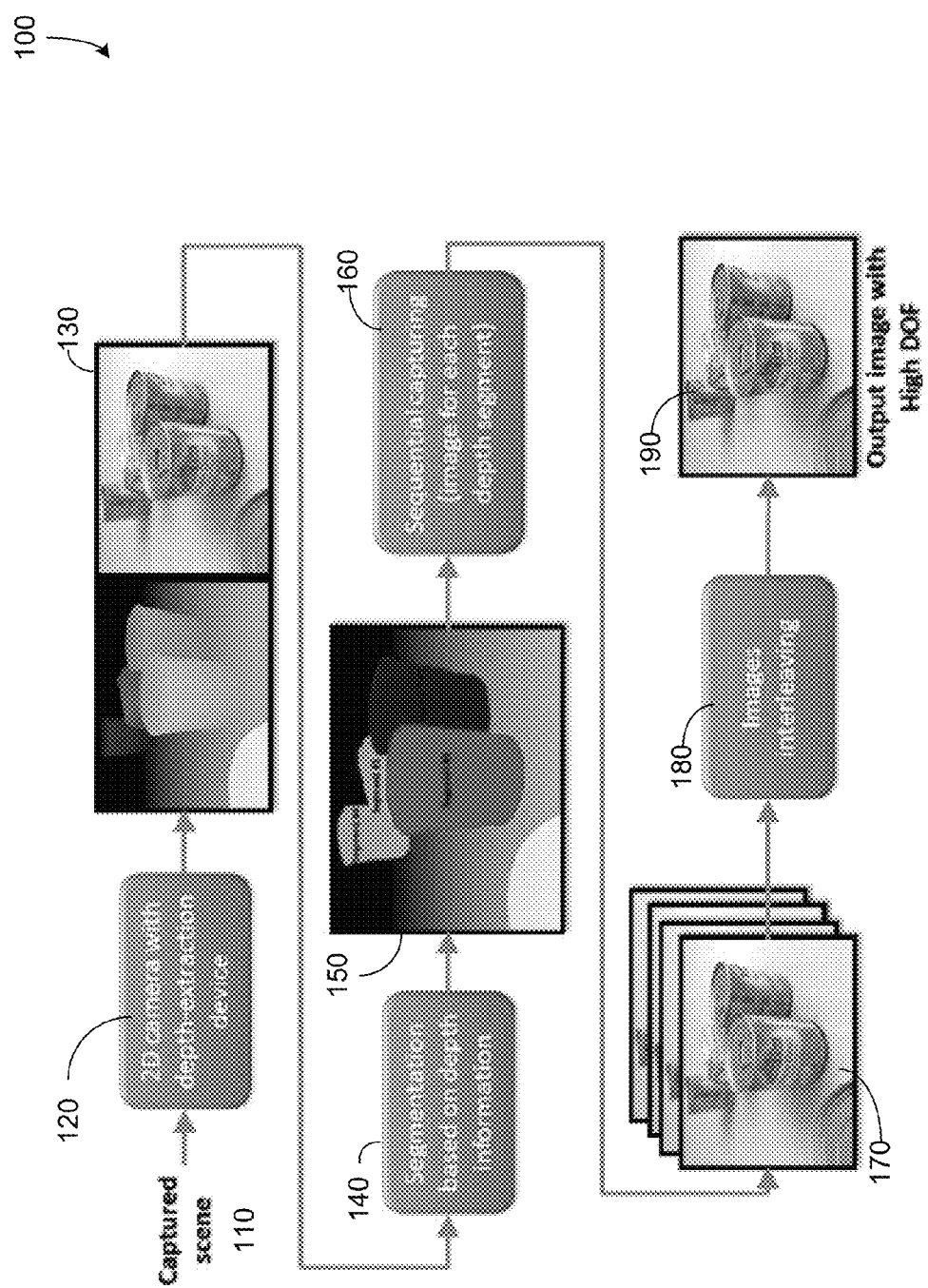
FIG. 1 is a block diagram of a system and process described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The methods, systems, and computer program products described herein may allow for the capturing of a high DOF image. A comprehensive depth map of the scene may be automatically determined. The scene may then be segmented, where each segment of the scene corresponds to a respective depth of the depth map. A sequence of images may then be recorded, where each image in the sequence is focused at a respective depth taken from the depth map. The images of this sequence may then be interleaved to create a single high DOF image that includes the respective in-focus segments from these images.

The overall processing of the system described herein is illustrated in FIG. 1, according to an embodiment. A scene 110 may be captured by a two-dimensional (2D) camera 120. In the illustrated embodiment, the camera 120 may include a depth extraction device. Such a device may create a depth map (not shown), which stores a number of points in the scene 130 (e.g., using X and Y coordinates) and, for each such point, stores a depth, i.e., a distance measurement (a Z coordinate) representing the distance between the camera and the point.

The depth map may be used by a module 140 to perform segmentation of the scene. Here, the scene may be decomposed into a sequence of segments, each corresponding to a respective depth in the depth map. In a given segment, each point in the segment may therefore have the same distance measurement, or Z coordinate. In the example of FIG. 1, the depth map may contain four distinct depths, and the scene 130 may therefore be decomposed into four respective segments as shown at 150. At 160, a set of respective images may be captured for the scene, where each image has a focal distance corresponding to the depth of one of the segments. In this example, four images 170 may be taken, one for each segment, where the focal distance of each image corresponds to the depth of the respective segment.

At 180, the images 170 may be interleaved to create a final composite image 190 as an output. In an embodiment, the interleaving may use the in-focus segment from each of the images 170, combining the segments to form the final composite image 190.

Note that this process does not require any manual determination or choice of the particular focal distances; rather, these distances are automatically compiled in the depth map by the depth extraction device. The depth map may be viewed as comprehensive in the sense that a plurality of distances, or depths, are dynamically identified and recorded in the map using the depth extraction device, and are not limited by a user's selection of particular depths, nor is the depth extraction device limited to predefined depths. In an embodiment, the recorded depths may then be used to capture corresponding segments of the scene. By interleaving these segments, a composite image results. This image may therefore have high DOF, because its various segments are all in focus.

Figure 2:
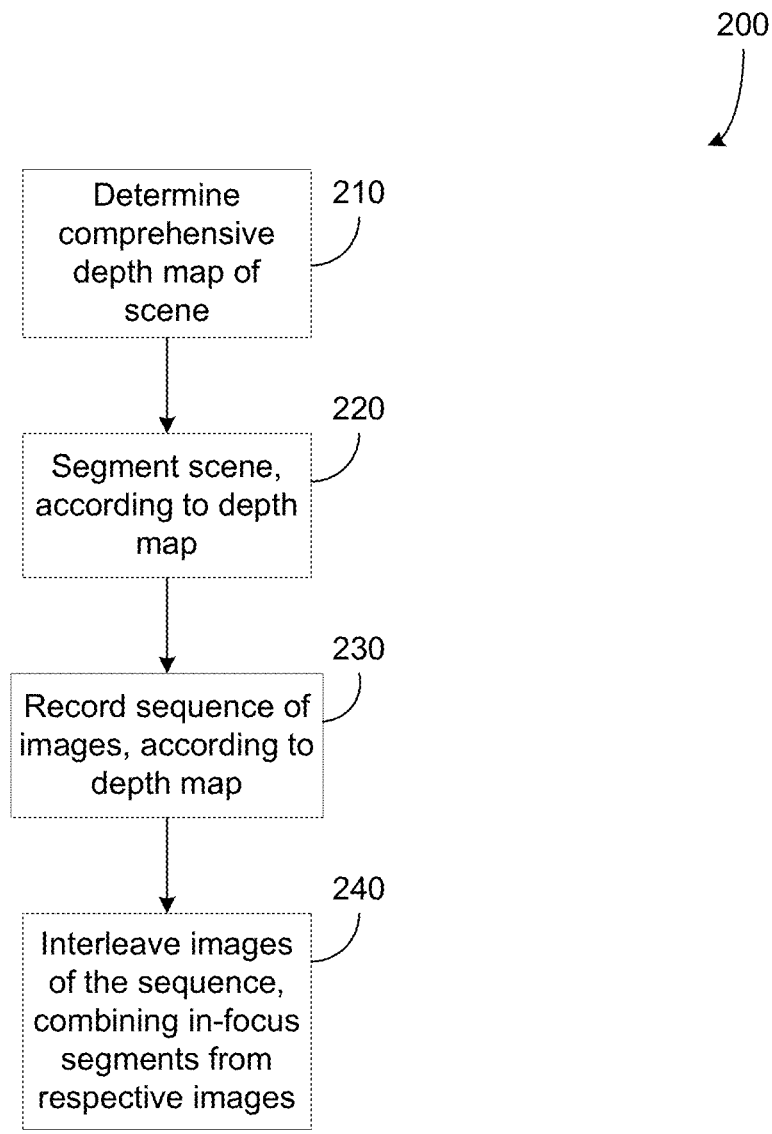
FIG. 2 is a flow chart illustrating the processing described herein, according to an embodiment.

This process is illustrated by the flowchart of FIG. 2, according to an embodiment. At 210, a comprehensive depth map may be created for a scene. At 220, the scene may be segmented according to the depth map, so that each segment includes points having the same depth. In an embodiment, there may be a segment for each depth that was recorded in the depth map. At 230, a sequence of images may be recorded according to the depth map. In this sequence, each image may be focused at a particular depth according to the map, so that each image may have one of the segments in focus. At 240, these images may be interleaved, so that the in-focus segments may be combined to form a single high DOF image.

Figure 3:
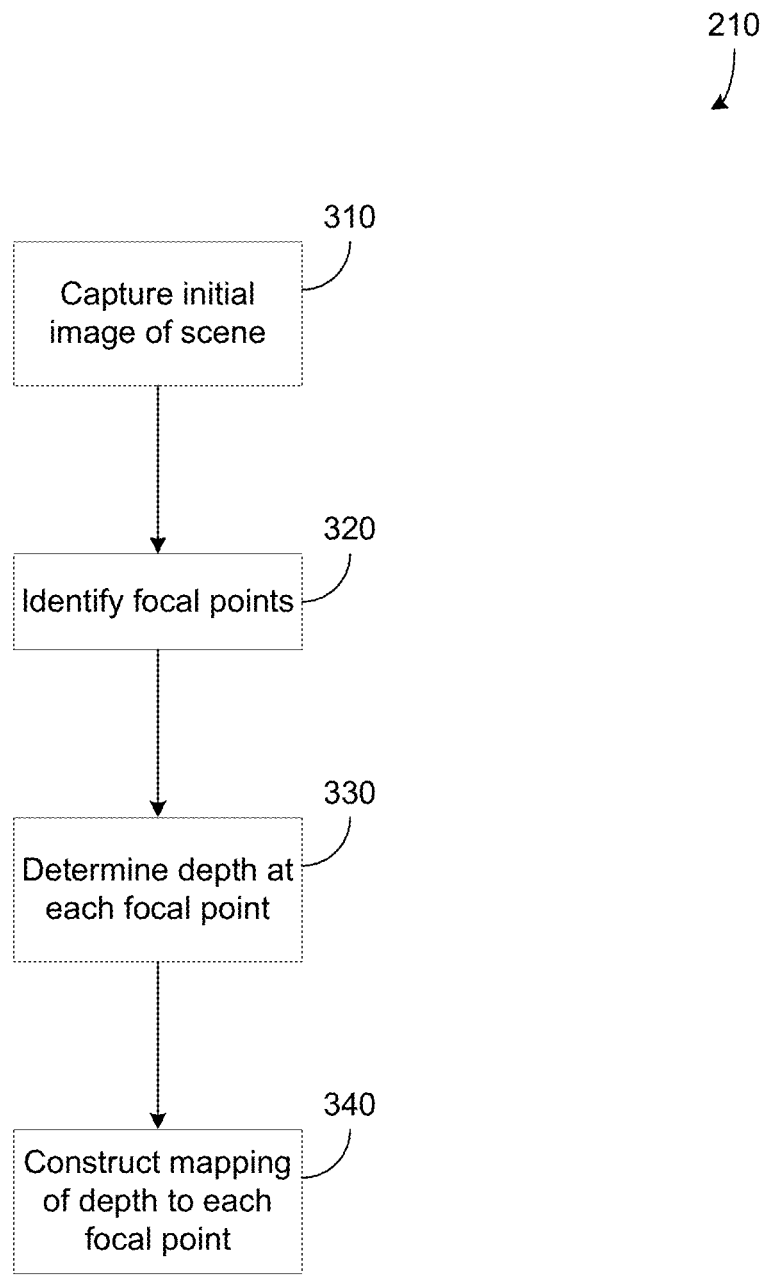
FIG. 3 is a flow chart illustrating the determination of a depth map, according to an embodiment.

The determination of a comprehensive depth map (210 of FIG. 2) is illustrated in FIG. 3, according to an embodiment. At 310, an initial image of the scene may be captured. To do this, a 2D camera may be used. At 320, a set of focal points in the scene may be identified. At 330, the depth or focal distance may be determined for each focal point. In an embodiment, a depth extraction device may be used for this purpose. In an embodiment, the depth extraction device may be part of the 2D camera. Examples of such a camera include the DepthSense™ camera available from SoftKinetic™ of Brussels, Belgium and the 3D camera available from PMD Technologies™ of Siegen, Germany. At 340, a depth map may be constructed, identifying a focal distance or depth with each identified focal point.

Figure 4:
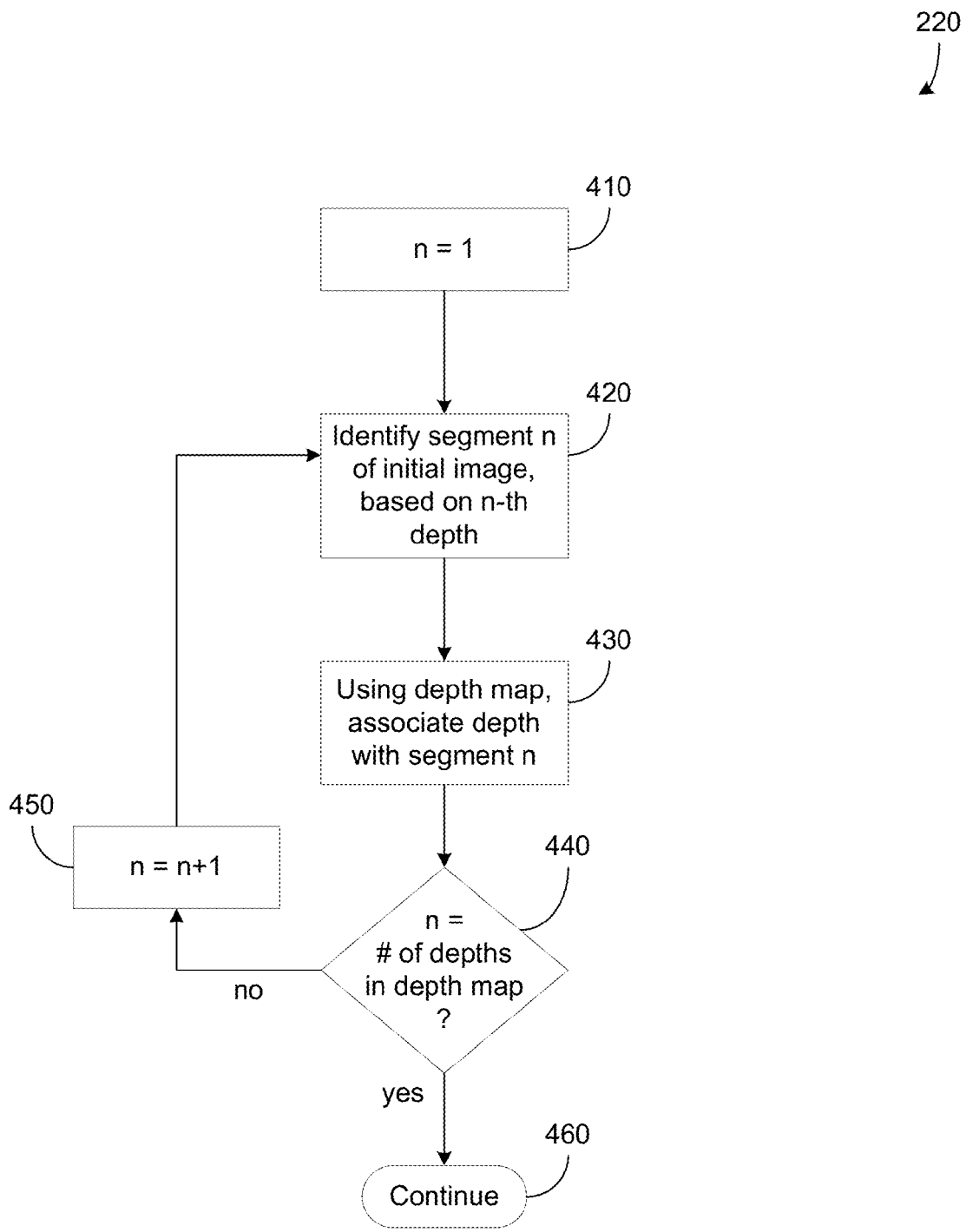
FIG. 4 is a flow chart illustrating the segmentation of a scene, according to an embodiment.

The segmentation of the scene is illustrated in greater detail in FIG. 4, according to an embodiment. In this example, a segment of the scene may be identified for each depth recorded in the depth map, in serial. At 410, an index n may be initialized to the value 1. At 420, a segment n of the initial image may be identified, corresponding to the n-th depth listed in the depth map. Points in the segment n may be at the same approximate depth. At 430, the corresponding depth may be associated with segment n. At 440, the determination may be made as to whether n has reached the number of depths listed in the depth map. If not, then n may be incremented at 450 and the process may be repeated starting at 420 for the next value of n. As would be understood by a person of ordinary skill in the art, alternative processes may be used in segmentation, apart from what is shown in this figure. For example, the identification of segments and the association of each segment with a particular depth may instead proceed in parallel.

Figure 5:
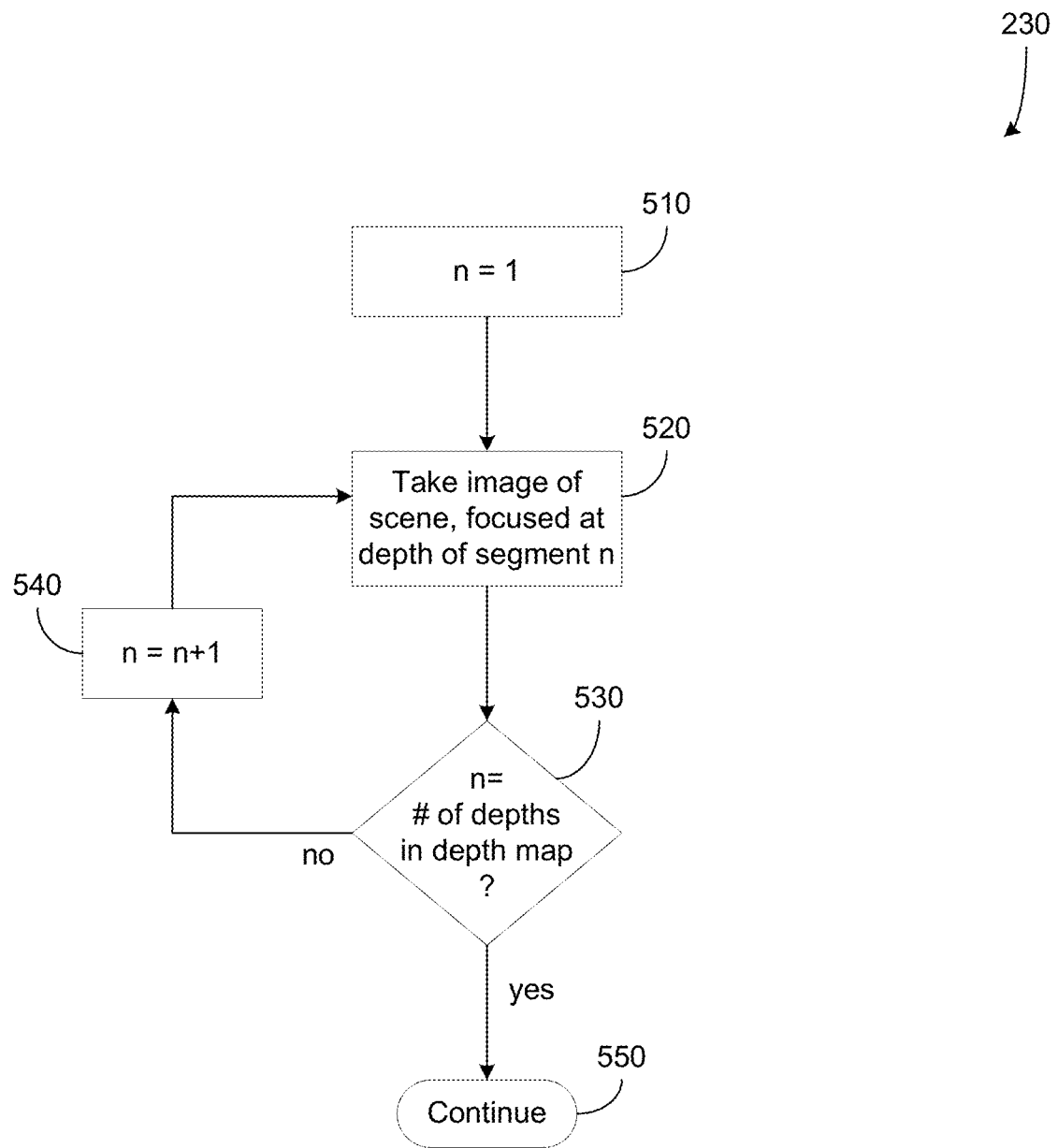
FIG. 5 is a flow chart illustrating the recording of a sequence of images, according to an embodiment.

The recording of the sequence of images is illustrated in FIG. 5, according to an embodiment. At 510, an index n may be initialized to the value 1. At 520, an image of the scene may be taken, where the focal distance or depth of the image is equal to the depth associated with segment n. This may result in an image in which segment n is in focus. At 530, a determination may be made as to whether the value n has reached the number of depths listed in the depth map. If not, then at 540 the index n may be incremented by 1. The process may then continue at 520, using the next value of n. Again, as would be understood by a person of ordinary skill in the art, alternative processes may be used in segmentation, apart from what is shown in this figure.

Figure 6:
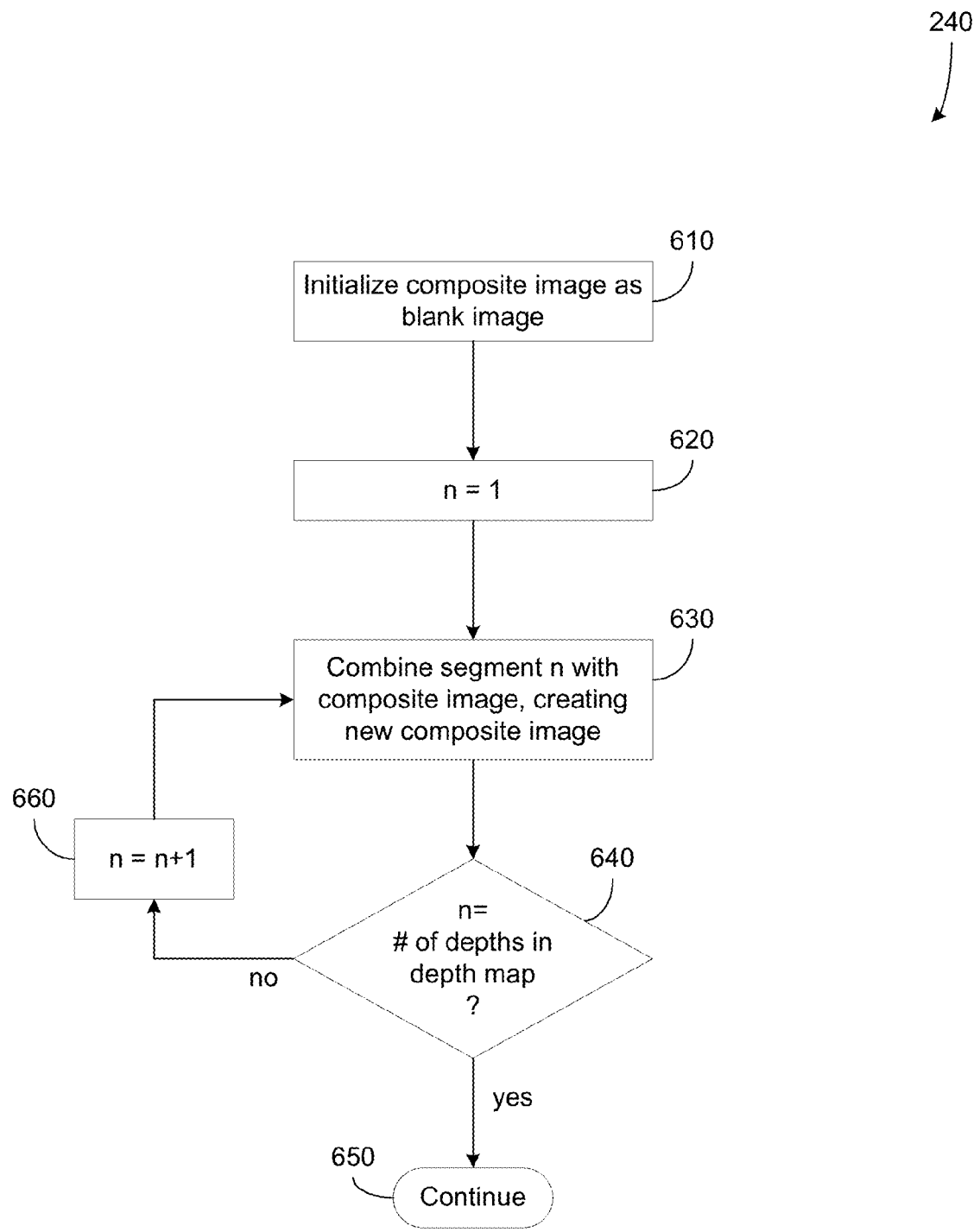
FIG. 6 is a flow chart illustrating an interleaving process, according to an embodiment.

The interleaving process (240 of FIG. 2) is illustrated in greater detail in FIG. 6, according to one embodiment. At 610, the process may begin with a blank image representing an initial composite image. As will be described below, segments will be added serially to this initial composite. At 620, an index n may be initialized to the value 1. At 630, the n-th segment may be combined with the current composite image, creating a new composite image. At 640, the determination may be made as to whether the index n has reached the total number of depths in the depth map. If not, then n may be incremented at 650. The process may then continue at 630 with the next segment n. In this way, all the segments may be combined into a single composite image. As would be understood by a person of ordinary skill in the art, alternative processes may be used in segmentation, apart from what is shown in FIG. 6.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

In an embodiment, some or all of the processing described herein may be implemented as software or firmware. Such a software or firmware embodiment is illustrated in the context of a computing system 700 in FIG. 7. System 700 may include one or more central processing unit(s) (CPU) 720 and a body of memory 710 that may include one or more non-transitory computer readable media that may store computer program logic 740. Memory 710 may be implemented as a read-only memory (ROM) or random access memory (RAM) device, for example. CPU 720 and memory 710 may be in communication using any of several technologies known to one of ordinary skill in the art, such as a bus or a point-to-point interconnect. Computer program logic 740 contained in memory 710 may be read and executed by CPU 720. In an embodiment, one or more I/O ports and/or I/O devices, shown collectively as I/O 730, may also be connected to CPU 720 and memory 710. In an embodiment, I/O 730 may include an input device for capturing a scene and an output device for the final high DOF image, for example.

Figure 7:
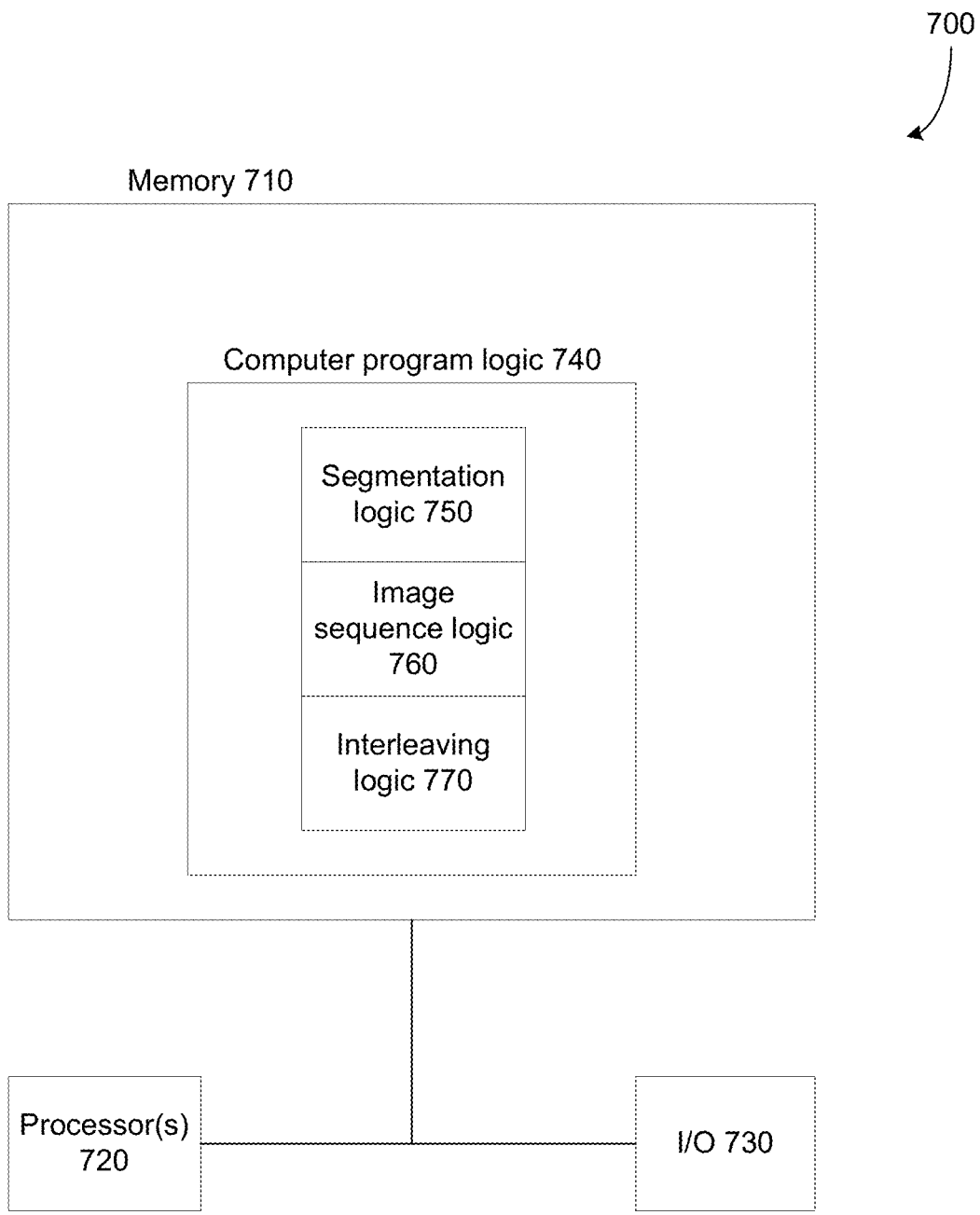
FIG. 7 is a block diagram illustrating a computing context of a software or firmware embodiment of the processing described herein.

In the embodiment of FIG. 7, computer program logic 740 may include a module 750 responsible for segmenting a scene. In an embodiment, this segmentation process may take place as described above with respect to FIG. 4. Computer program logic 740 may also include a module 760 responsible for controlling the recording of a sequence of images as described above with respect to FIG. 5, for example. Computer program logic 740 may also include a module 770 responsible for interleaving the sequence of images. In an embodiment, this process may proceed according to the description of FIG. 6.

Figure 8:
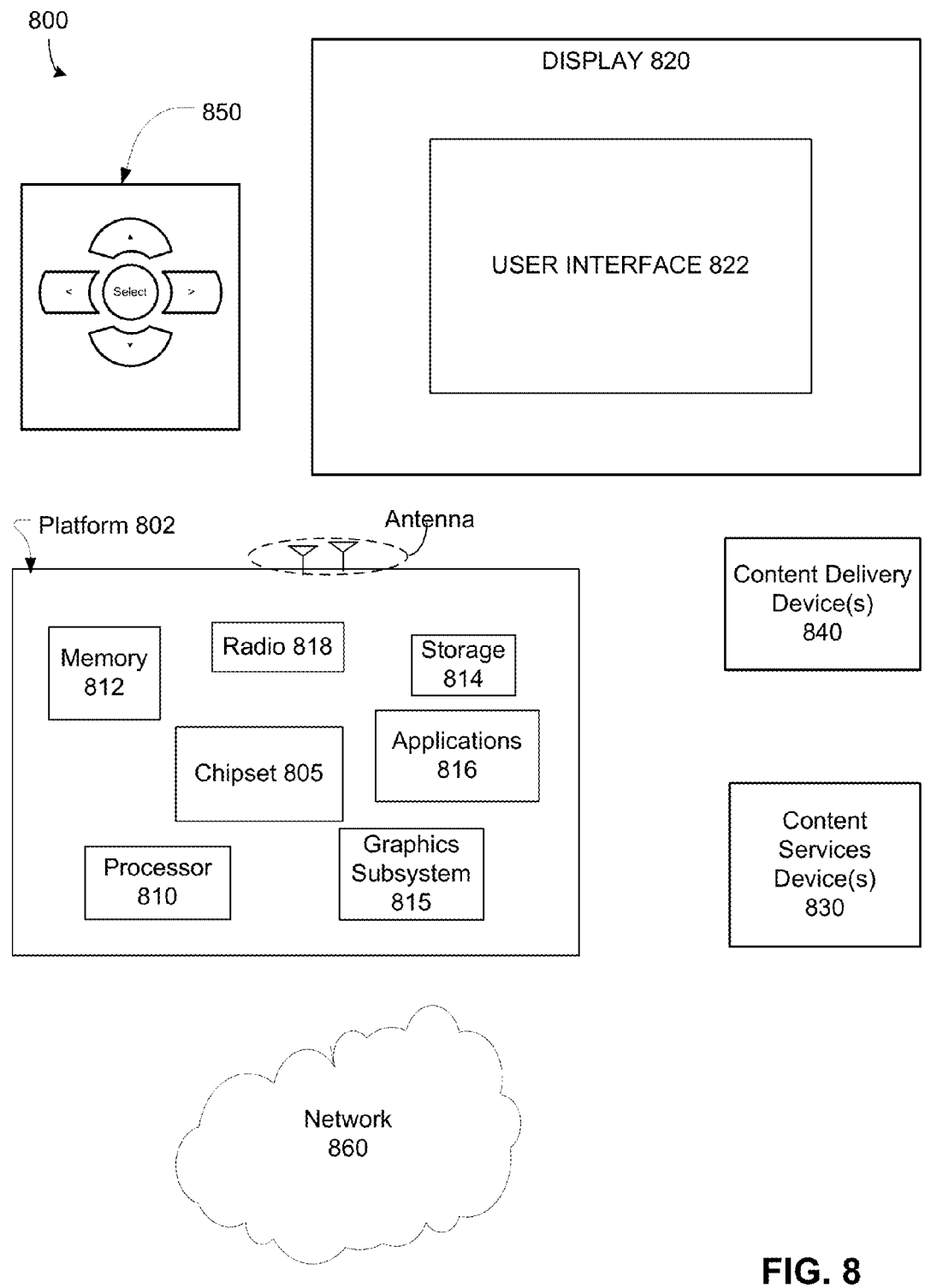
FIG. 8 is a block diagram illustrating an information system that may incorporate the system described herein, according to an embodiment.

The systems, methods, and computer program products described above may be a part of a larger information system. FIG. 8 illustrates such an embodiment, as a system 800. In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 comprises a platform 802 coupled to a display 820. Platform 802 may receive content from a content device such as content services device(s) 830 or content delivery device(s) 840 or other similar content sources. A navigation controller 850 comprising one or more navigation features may be used to interact with, for example, platform 802 and/or display 820. Each of these components is described in more detail below.

In embodiments, platform 802 may comprise any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 810 may comprise dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 814 may comprise technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In embodiments, display 820 may comprise any television type monitor or display configured to display images such as graphics processed by the processing units discussed above. Display 820 may comprise, for example, a computer display screen, touch screen display, video monitor, television-like device, and/or a television. Display 820 may be digital and/or analog. In embodiments, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In embodiments, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 receives content such as cable television programming including media information, digital information, and/or other content. Examples of content providers may include any cable or satellite television or radio or Internet content providers. The provided examples are not meant to limit embodiments of the invention.

In embodiments, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but integrated into platform 802 and/or display 820.

Embodiments, however, are not limited to the elements or in the context shown or described herein.

In embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chip set 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the invention.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
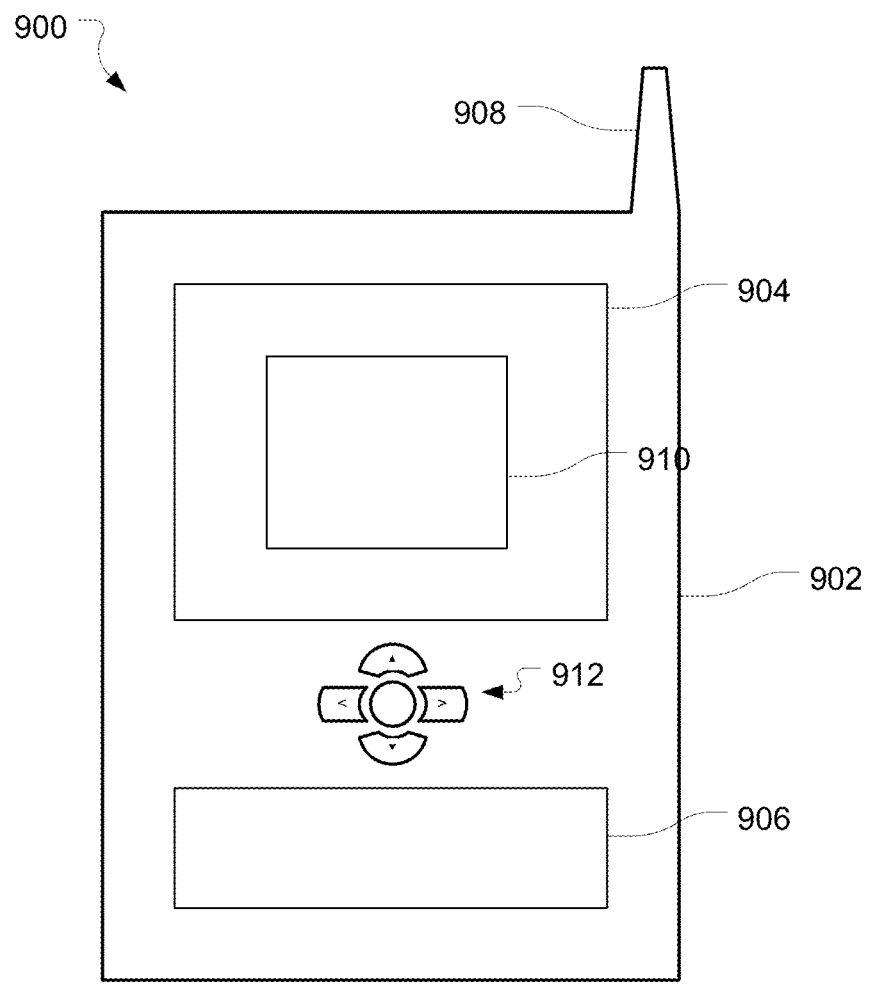
FIG. 9 illustrates a device that may incorporate the system described herein, according to an embodiment.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device. Displayed information may include graphics processed by processing units, e.g., GPUs. I/O device 906 may comprise any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

The above discussion describes various embodiments, including a method that may comprise automatically determining a comprehensive depth map of a scene; segmenting the scene, wherein each segment of the scene corresponds to a respective depth in the depth map and each depth in the depth map has a corresponding segment; recording a sequence of images, wherein each image of the sequence is focused at a respective depth of the depth map; and interleaving the images in the sequence, to form a final composite image of the scene. The determination of the depth map may comprise
capturing an initial image of the scene; identifying a comprehensive plurality of focal points in the scene at a respective plurality of distinct depths; determining the depth at each focal point; and constructing a mapping of the depths to the respective focal points. The segmenting of the scene may comprise identifying a plurality of segments of the initial image, where the points in each segment have a distance approximately equal to the depth of a focal point in the segment, wherein a segment is identified for each depth of the depth map. Each segment may contain a single focal point identified in the determination of the depth map. The recording of the sequence of images may result in each image of the sequence having a respective segment in focus. The composite image may comprise in-focus segments from the respective images in the sequence.

The above discussion also describes embodiments that include a system comprising a processor; a first logic unit configured to segment the scene, wherein each segment of the scene corresponds to a respective depth in a comprehensive depth map created by a depth extraction device and each depth in the depth map has a corresponding segment; a second logic unit configured to record a sequence of images, wherein each image of the sequence is focused at a respective depth of the depth map; and a third logic unit configured to interleave the images in the sequence, to form a final composite image of the scene. The depth extraction device may be configured to capture an initial image of the scene; identify a comprehensive plurality of focal points in the scene at a respective plurality of distinct depths; determine the depth at each focal point; and construct a mapping of the depths to the respective focal points. The first logic unit may comprise a logic unit configured to identify a plurality of segments of the initial image, where the points in each segment have a distance approximately equal to the depth of a focal point in the segment, wherein a segment is identified for each depth of the depth map. Each segment may contain a single focal point identified in the determination of the depth map. The recording of the sequence of images may result in each image of the sequence having a respective segment in focus. The composite image may comprise in-focus segments from the respective images in the sequence.

The above discussion also describes embodiments that include a computer program product. Such a computer program product may include at least one non-transitory computer readable medium having computer program logic stored therein. The computer program logic may include logic to cause a processor to segment a scene, wherein each segment of the scene corresponds to a respective depth in a depth map that was automatically determined by a depth extraction device and each depth in the depth map has a corresponding segment; logic to cause the processor to record a sequence of images, wherein each image of the sequence is focused at a respective depth of the depth map; and logic to cause the processor to interleave the images in the sequence, to form a final composite image of the scene. The depth extraction device may be configured to capture an initial image of the scene; identify a comprehensive plurality of focal points in the scene at a respective plurality of distinct depths; determine the depth at each focal point; and construct a mapping of the depths to the respective focal points. The segmentation of the scene may comprise identifying a plurality of segments of the initial image, where the points in each segment have a distance approximately equal to the depth of a focal point in the segment, wherein a segment is identified for each depth of the depth map. Each segment may contain a single focal point identified in the determination of the depth map. The recording of the sequence of images may result in each image of the sequence having a respective segment in focus. The composite image may comprise in-focus segments from the respective images in the sequence.

The methods, systems, and computer program products described herein may allow for the capturing of a high DOF image. Such an image includes a plurality of in-focus segments from a respective plurality of images, each of which were focused at a depth determined by a comprehensive depth map.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   apportioning points of a first image of a scene amongst a number of groups, wherein the number of groups is based on a number of distinct depth values in a depth map of the first image, and wherein the apportioning includes associating each group with a respective one of the distinct depth values of the depth map and associating each point of the first image with one of the groups based on a depth value of the respective point and the distinct depth values associated with the respective groups;
   determining a focal distance for each group based on the distinct depth value associated with the respective group of points;
   controlling an image capture device to capture an additional image of the scene for each group including, for each additional image, focusing the image capture device at the focal distance determined for a respective one of the groups to capture a respective group of points of the additional image in-focus; and
   combining the groups of points of the respective additional images to provide a composite image of the scene for which an object of the scene nearest to the image capture device and an object of the scene further from the image capture device are in-focus.

2. The method of claim 1, wherein points of each group have approximately equal depth values.

3. A system, comprising a processor and memory configure to:
   apportion points of a first image of a scene amongst a number of groups, wherein the number of groups is based on a number of distinct depth values in a depth map of the first image, including to associate each group with a respective one of the distinct depth values of the depth map and to associate each point of the first image with one of the groups based on a depth value of the respective point and the distinct depth values associated with the respective groups;
   determine a focal distance for each group based on the distinct depth value associated with the respective group of points;
   control an image capture device to capture an additional image of the scene for each group including, for each additional image, to focus the image capture device at the focal distance determined for a respective one of the groups to capture a respective groups of points of the additional image in-focus; and
   combine the groups of points of the respective additional images to provide a composite image of the scene for which an object of the scene nearest to the image capture device and an object of the scene further from the image capture device are in-focus.

4. The system of claim 3, wherein points of each group have approximately equal depth values.

5. A non-transitory computer readable medium encoded with a computer program including instructions to cause a processor to:
- apportion points of a first image of a scene amongst a number of groups, wherein the number of groups is based on a number of distinct depth values in a depth map of the first image, including to associate each group with a respective one of the distinct depth values of the depth map and to associate each point of the first image with one of the groups based on a depth value of the respective point and the distinct depth values associated with the respective groups;
- determine a focal distance for each group based on the distinct depth value associated with the respective group of points;
- control an image capture device to capture an additional image of the scene for each group including, for each additional image, to focus the image capture device at the focal distance determined for a respective one of the groups to capture a respective groups of points of the additional image in-focus; and
- combine the groups of points of the scene of the respective additional images to provide a composite image of the scene for which an object of the scene nearest to the image capture device and an object of the scene further from the image capture device are in-focus.

6. The non-transitory computer readable medium of claim 5, wherein points of each group have approximately equal depth values.

* * * * *